United States Patent
Bradley et al.

(10) Patent No.: US 12,528,062 B2
(45) Date of Patent: Jan. 20, 2026

(54) BLENDER ASSEMBLY

(71) Applicant: WHIRLPOOL CORPORATION, Benton Harbor, MI (US)

(72) Inventors: Samuel James Bradley, Mundelein, IL (US); Rebecca Katherine Kasner, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 650 days.

(21) Appl. No.: 17/937,807

(22) Filed: Oct. 4, 2022

(65) Prior Publication Data
US 2023/0114542 A1    Apr. 13, 2023

Related U.S. Application Data

(60) Provisional application No. 63/253,289, filed on Oct. 7, 2021.

(51) Int. Cl.
*B01F 35/90* (2022.01)
*A47J 43/046* (2006.01)
*A47J 43/08* (2006.01)
*A47J 43/044* (2006.01)

(52) U.S. Cl.
CPC ............. *B01F 35/90* (2022.01); *A47J 43/046* (2013.01); *A47J 43/085* (2013.01); *A47J 2043/0449* (2013.01); *B01F 2035/99* (2022.01)

(58) Field of Classification Search
CPC .. A47J 2043/0449; A47J 43/046; B01F 35/90
See application file for complete search history.

(56) References Cited

U.S. PATENT DOCUMENTS

| | | | |
|---|---|---|---|
| 6,318,247 B1 * | 11/2001 | Di Nunzio | A47J 43/0465 99/287 |
| 7,780,337 B2 * | 8/2010 | Peng | B01F 27/88 366/144 |
| 7,878,702 B2 | 2/2011 | Peng | |
| 8,152,083 B2 | 4/2012 | Bower et al. | |
| 9,089,238 B2 | 7/2015 | Lin | |
| 10,327,594 B2 * | 6/2019 | Ivarsson | A47J 27/004 |
| 2020/0069110 A1 | 3/2020 | Wang et al. | |
| 2021/0022557 A1 * | 1/2021 | Atinaja | A23L 21/10 |

FOREIGN PATENT DOCUMENTS

| | | |
|---|---|---|
| CN | 108420337 A | 8/2018 |
| EP | 1563779 A2 | 8/2005 |
| WO | 2014067252 A1 | 5/2014 |

* cited by examiner

*Primary Examiner* — Anshu Bhatia
(74) *Attorney, Agent, or Firm* — Price Heneveld LLP

(57) ABSTRACT

A blender assembly includes a base, a heater assembly selectively coupled to the base and having a heating element and a biasing feature that biases the heating element away from the base, and a jar assembly selectively coupled to the heater assembly and having a jar and a heat transfer element coupled to the jar. Coupling the jar assembly to the heater assembly prompts the heat transfer element to contact the heating element, such that the heating element moves toward the base against the bias of the biasing feature.

19 Claims, 14 Drawing Sheets

ND ASSEMBLY

BLENDER ASSEMBLY

CROSS-REFERENCE TO RELATED APPLICATIONS

The present application claims priority to U.S. Provisional Patent Application No. 63/253,289, filed Oct. 7, 2021, entitled "BLENDER ASSEMBLY," the entire disclosure of which is hereby incorporated herein by reference.

BACKGROUND OF THE DISCLOSURE

The present disclosure generally relates to a blender assembly, and more specifically, to a blender assembly that includes a heater assembly that is selectively coupled to a jar assembly.

SUMMARY OF THE DISCLOSURE

According to one aspect of the present disclosure, a blender assembly includes a base, a heater assembly, and a jar assembly. The heater assembly is selectively coupled to the base and has a heating element. The jar assembly is selectively coupled to the heater assembly and has a jar and a heat transfer element coupled to the jar. The heat transfer element contacts the heating element when the jar assembly is coupled to the heater assembly.

According to another aspect of the present disclosure, a heater assembly for a blender assembly includes a collar that defines an interior space, a heating element disposed at least partially within the interior space, and a biasing feature operably coupled with the collar and the heating element and being configured to bias the heating element in a first direction. In the first direction, the heating element is operable to move relative to the collar in a second direction that is opposite the first direction against the bias of the biasing feature.

According to yet another aspect of the present disclosure, a blender assembly includes a base, a heater assembly selectively coupled to the base and having a heating element and a biasing feature that biases the heating element away from the base, and a jar assembly selectively coupled to the heater assembly and having a jar and a heat transfer element coupled to the jar. Coupling the jar assembly to the heater assembly prompts the heat transfer element to contact the heating element, such that the heating element moves toward the base against the bias of the biasing feature.

These and other features, advantages, and objects of the present disclosure will be further understood and appreciated by those skilled in the art by reference to the following specification, claims, and appended drawings.

Figure 1:
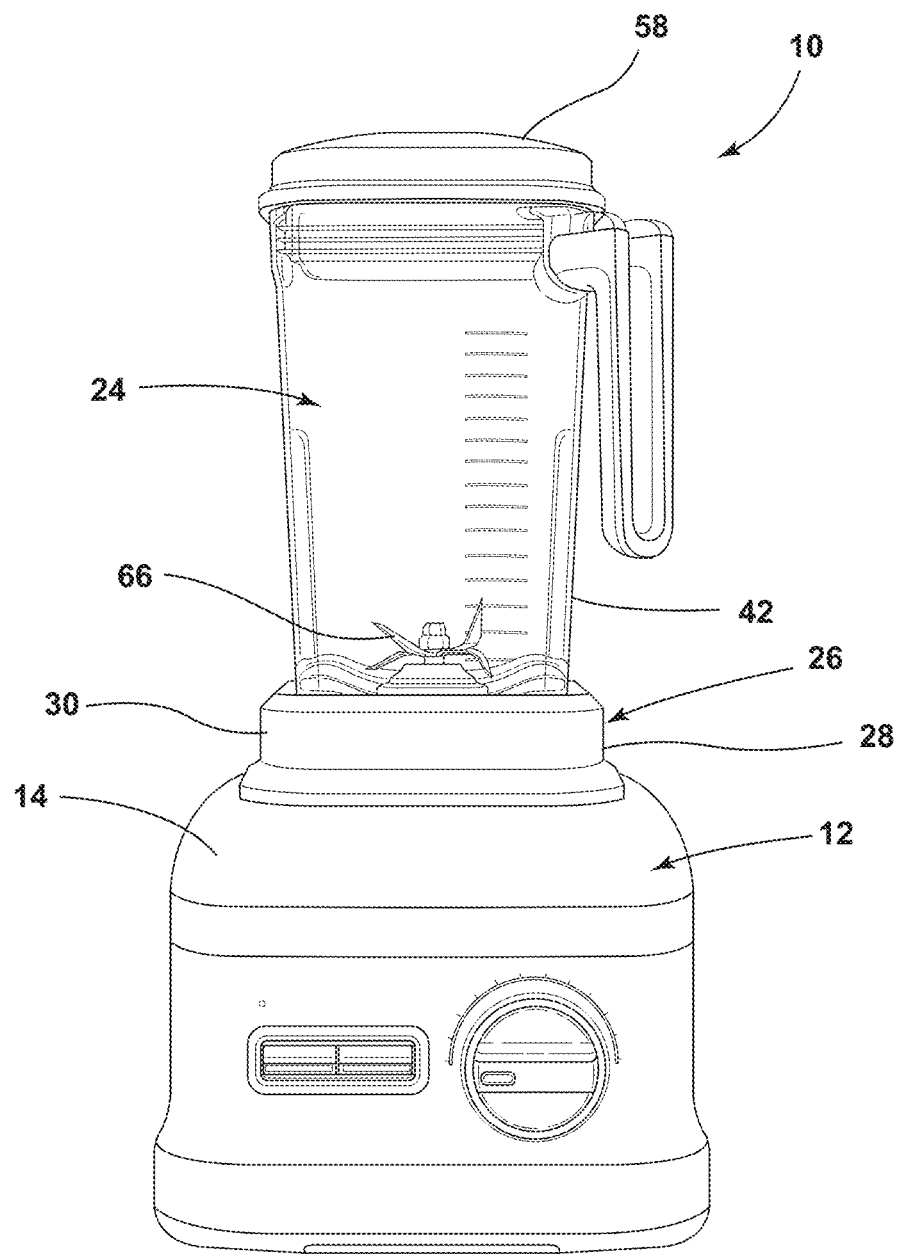
FIG. 1 is a front elevational view of a blender assembly.

The components in the figures are not necessarily to scale, emphasis instead being placed upon illustrating the principles described herein.

DETAILED DESCRIPTION

The present illustrated embodiments reside primarily in combinations of method steps and apparatus components related to a blender assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
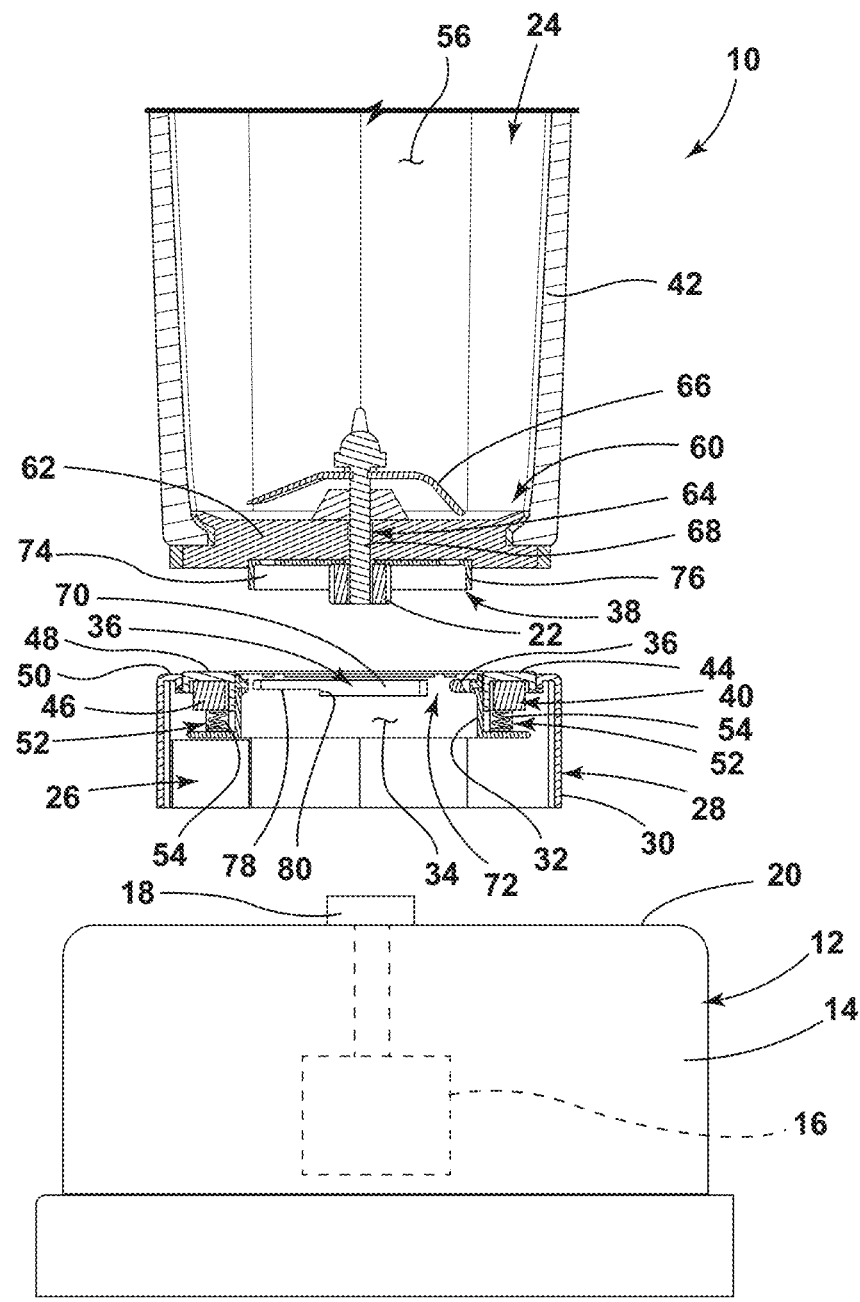
FIG. 2 is an exploded front elevational cross-sectional view of a blender assembly illustrating a jar assembly, a heater assembly, and a housing assembly.
Figure 3:
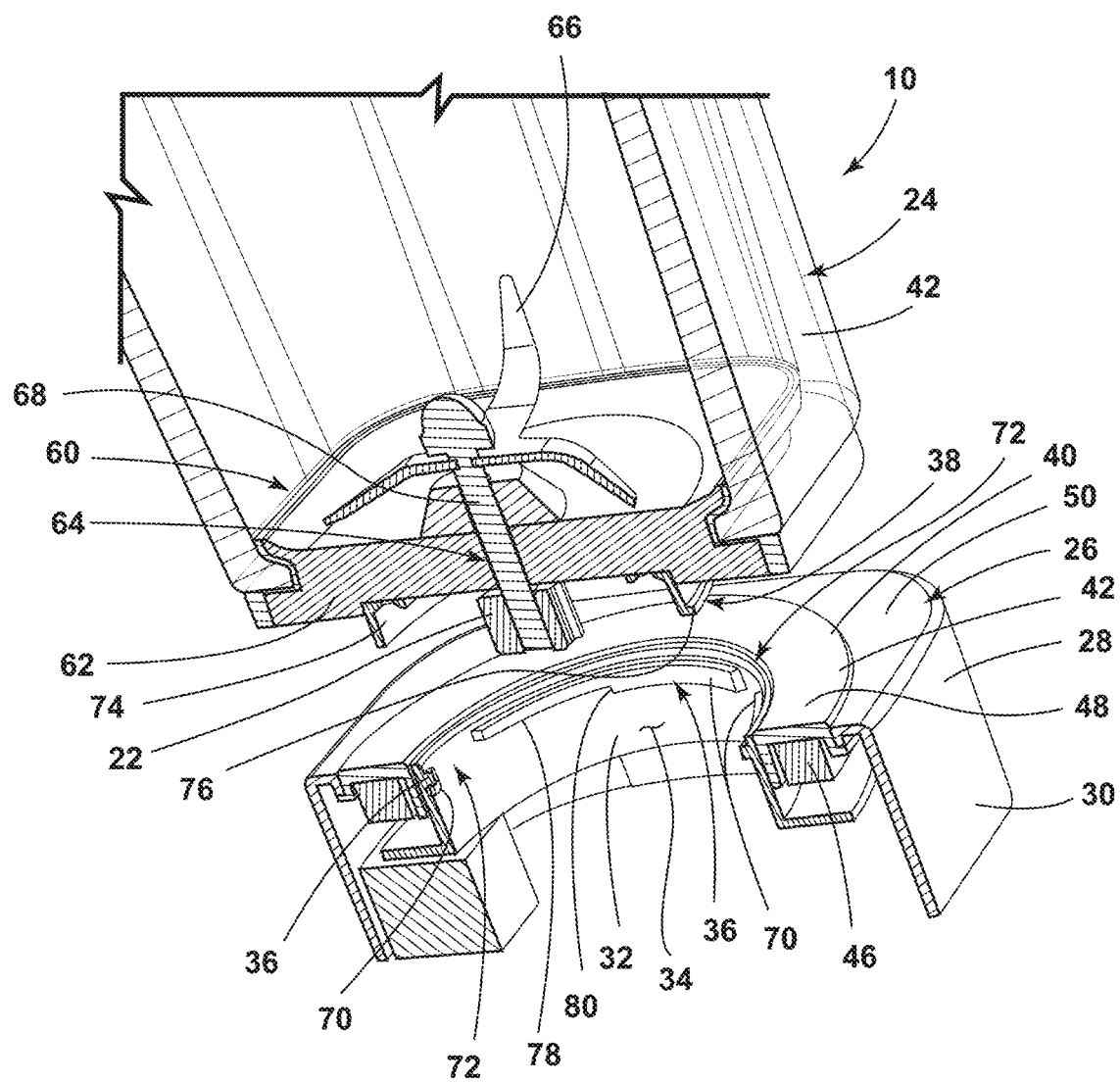
FIG. 3 is a partial top perspective view of the jar assembly and the heater assembly of FIG. 2.

In the embodiment shown in FIGS. 1-3, a blender assembly 10 is shown. As used herein, the term "blender assembly" includes a blender, food processor, or other device for processing food having a jar with a rotary tool for processing the food. The blender assembly 10 includes a housing assembly 12 having a base 14 with a motor 16 disposed therein. The housing assembly 12 further includes a lower coupler 18 that is operably coupled to the motor 16. The lower coupler 18 can be positioned above and/or at a top 20 of the base 14, as illustrated in FIG. 2. The lower coupler 18 is configured to be operably coupled with an upper coupler 22 of a jar assembly 24, as described further herein.

Referring still to FIGS. 1-3, the blender assembly 10 further includes a heater assembly 26. The heater assembly 26 includes a collar 28. The collar 28 can be generally annular and includes an exterior wall 30 and an interior wall 32. The interior wall 32 defines an interior space 34, as illustrated in FIGS. 2 and 3. The collar 28 includes a first attachment feature 36. In some implementations, the interior wall 32 of the collar 28 includes the first attachment feature 36. For example, as illustrated in FIGS. 2 and 3, the first attachment feature 36 is integrally coupled with the interior wall 32 and extends into the interior space 34 defined by the interior wall 32. The first attachment feature 36 is configured to be engaged with a second attachment feature 38 of the jar assembly 24, as described further herein. In some implementation, the collar 28 may include a plurality of components.

Referring now to FIGS. 2 and 3, the heater assembly 26 further includes a heating element 40. The heating element 40 is configured to emit heat to warm the contents of a jar 42 of the jar assembly 24, as described further herein. As illustrated in FIG. 3, the heating element 40 is positioned between the exterior and interior walls 30, 32 of the collar 28 and is generally annular in shape. In some implementations, the heating element 40 may be an assembly of components. For example, in the embodiment illustrated in FIG. 3, the heating element 40 includes an annular puck 44 and a heater coil 46 that is coupled to the annular puck 44. In the illustrated embodiment, the annular puck 44 of the heating element 40 has a substantially planar upper surface 48. The upper surface 48 is elevated relative to a top surface 50 of the collar 28 that extends inboard from the exterior wall 30 of the collar 28.

As illustrated in FIG. 2, the heater assembly 26 includes a biasing feature 52. The biasing feature 52 is operably coupled to the collar 28 and the heating element 40 and is configured to exert a biasing force vertically upward against the heating element 40. In some implementations, the biasing force exerted on the heating element 40 is directed away from the base 14 of the housing assembly 12 in an attached condition of the heater assembly 26, wherein the heater assembly 26 is attached to the base 14 of the housing assembly 12, as described further herein. The biasing force exerted on the heating element 40 by the biasing feature 52 may cause the heating element 40 to be positioned relative to the collar 28, such that the upper surface 48 of the annular puck 44 of the heating element 40 is elevated (vertically higher) relative to the top surface 50 of the collar 28. As described further herein, an exertion of an opposite force on the heating element 40 can counter the force exerted by the biasing feature 52 and move the heating element 40 downward, toward the base 14. In some implementations, the biasing feature 52 may move downward, such that the upper surface 48 of the annular puck 44 is elevationally even with or below the top surface 50 of the collar 28. In some implementations, the upper surface 48 of the annular puck 44 may remain elevationally above the top surface 50 of the collar 28, despite the downward movement of the heating element 40. Various types of biasing features 52 are contemplated (e.g., spring, resilient member, bands, etc.). As illustrated in FIG. 2, the biasing feature 52 is a compression spring 54 positioned downward of the heating element 40.

Referring now to FIGS. 1-3, the blender assembly 10 includes the jar assembly 24. The jar assembly 24 includes the jar 42 for receiving food for blending therein. The jar 42 defines an upper opening 56 that can be covered by a lid 58, as illustrated in FIG. 1, and a lower opening 60 opposite the upper opening 56. A heat transfer element 62 is coupled to the jar 42 and is configured to cover the lower opening 60 of the jar 42. In the embodiment illustrated in FIGS. 2 and 3, the heat transfer element 62 generally fills the lower opening 60, such that the heat transfer element 62 functions as a bottom to the jar 42. In various implementations, the jar 42 and the heat transfer element 62 are formed of different materials. For example, the jar 42 may be formed of a transparent material, such as glass or plastic, and the heat transfer element 62 may be formed of a material that is an efficient thermal conductor, such as a metal alloy. As illustrated in FIG. 3, the heat transfer element 62 defines a heat transfer element aperture 64 that extends through the heat transfer element 62. The jar assembly 24 further includes a blade 66 that is positioned upward of the heat transfer element 62. A shaft 68 is coupled to the blade 66 and extends from the blade 66 through the heat transfer element aperture 64 to the upper coupler 22, which is coupled thereto. The aforementioned second attachment feature 38 is coupled to the jar 42 and/or the heat transfer element 62 and positioned downward of the blade 66 and/or the heat transfer element 62.

Referring still to FIGS. 1-3, the jar assembly 24 is configured to be selectively coupled to the heater assembly 26. In other words, the jar assembly 24 is operable to move between an engaged condition, wherein the second attachment feature 38 of the jar assembly 24 is engaged with the first attachment feature 36 of the heater assembly 26 to maintain the jar assembly 24 and the heater assembly 26 in a coupled-relationship, and a disengaged condition, wherein the second attachment feature 38 is disengaged from the first attachment feature 36. In the disengaged condition, the heater assembly 26 is configured to be removed from the jar assembly 24, such that the heater assembly 26 and the jar assembly 24 are in a spaced-relationship with each other.

As illustrated in FIG. 3, the interior wall 32 of the collar 28 is generally cylindrical. The first attachment feature 36 coupled to the interior wall 32 includes a plurality of ribs 70 that extend in a generally circumferential direction along the interior wall 32. The plurality of ribs 70 are circumferentially spaced apart by a plurality of gaps 72. As further illustrated in FIG. 3, the second attachment feature 38 of the jar assembly 24 includes a second attachment feature collar 74 that extends downward from the heat transfer element 62, and a plurality of tangs 76 that extend outboard from the second attachment feature collar 74. The plurality of tangs 76 correspond with the plurality of gaps 72 between the plurality of ribs 70 of the first attachment feature 36.

In operation of the embodiment illustrated in FIG. 3, the jar assembly 24 moves from the disengaged condition to the engaged condition as follows. First, the jar assembly 24 is positioned above the heater assembly 26, such that the plurality of tangs 76 are aligned with the plurality of gaps 72 between the plurality of ribs 70 of the first attachment feature 36. Next, the jar assembly 24 is moved downward relative to the heater assembly 26, such that the tangs 76 pass through the gaps 72 and are positioned lower than at least a portion of an underside 78 of each of the plurality of ribs 70.

Next, the jar assembly 24 is rotated relative to the heater assembly 26, which causes each of the plurality of tangs 76 to move beneath the underside 78 of each of the plurality of ribs 70, respectively. The underside 78 of each of the plurality of ribs 70 is angled, such that contact between the plurality of tangs 76 and the undersides 78 of the corresponding plurality of ribs 70 draws the jar assembly 24 downward toward the heater assembly 26 as the jar assembly 24 is rotated toward the engaged condition. As such, a portion of the rotational force applied to the heater assembly 26 is converted into a downward force that causes vertical compression of the heater assembly 26 and the jar assembly 24.

As described above herein, the heating element 40 is yieldingly maintained in an elevated position by the biasing feature 52, such that the upper surface 48 of the annular puck 44 of the heating element 40 is elevated relative to the top surface 50 of the collar 28. As the jar assembly 24 is rotated to the engaged position, the heat transfer element 62 forcibly contacts the annular puck 44 of the heating element 40 of the heater assembly 26. The downward force exerted on the jar assembly 24 due to the angled contact between the tangs 76 and ribs 70 counters the upward biasing force exerted on the heating element 40 by the biasing feature 52, such that the heating element 40 moves downward to a position where the upper surface 48 of the annular puck 44 is elevationally even with or below the top surface 50 of the collar 28. The opposite forces exerted on the heating element 40 by the heat transfer element 62 and the biasing feature 52 may ensure sufficient contact between the heating element 40 and the heat transfer element 62 for effective heat transfer from the heating element 40 to the heat transfer element 62.

As illustrated in FIG. 3, at least one of the plurality of ribs 70 of the first attachment feature 36 includes a stop 80 that limits the rotational travel of the jar assembly 24 relative to the heater assembly 26. It is contemplated that the first and second attachment features 36, 38 may be one or more of a variety of types of corresponding features configured to facilitate selective coupling of the jar assembly 24 and the heater assembly 26, in various embodiments. For example, the first and second attachment features 36, 38 can be corresponding threads configured for threaded engagement with each other. A variety of features are contemplated (e.g., magnetic connectors, snap-fit connectors, mating connectors, etc.).

Referring now to FIGS. 1 and 2, the heater assembly 26 is configured to be selectively coupled with the housing assembly 12. In other words the heater assembly 26 is operable to move between an attached condition, wherein the heater assembly 26 is attached to the housing assembly 12, and a detached condition, wherein the heater assembly 26 is detached from the housing assembly 12. In various implementations, the heater assembly 26 is selectively coupled to the housing assembly 12 via the base 14 of the housing assembly 12, such that in the attached condition, the heater assembly 26 is attached to the base 14 of the housing assembly 12, as illustrated in FIG. 1. The heater assembly 26 may be selectively coupled with the housing assembly 12 via at least one of a variety of features configured to attach two components (e.g., snap-fit connectors, magnetic connectors, mating connectors, etc.). In some implementations, movement of the heater assembly 26 to the attached condition can cause the heating element 40 to become electrically coupled to a power source of the housing assembly 12. For example, movement of the heater assembly 26 to the attached condition can cause the heating element 40 to become electrically coupled to a power source that also powers the motor 16 disposed within the housing assembly 12. In some implementations, the lower coupler 18 of the housing assembly 12 is positioned within the interior space 34 defined by the collar 28 of the heater assembly 26 in the attached condition of the heater assembly 26.

Referring still to FIGS. 1 and 2, the jar assembly 24 is configured to be selectively coupled to the housing assembly 12. In other words, the jar assembly 24 is configured to be operable to move between an operably coupled condition, wherein the jar assembly 24 is operably coupled with the housing assembly 12, and a decoupled condition, wherein the jar assembly 24 is decoupled from the housing assembly 12. The upper coupler 22 is operably coupled with the lower coupler 18 in the operably coupled condition, such that rotation of the lower coupler 18 by the motor 16 prompts rotation of the upper coupler 22. In some implementations, the upper coupler 22 is directly coupled with the lower coupler 18 in the operably coupled condition. In some embodiments, the upper coupler 22 may be operably coupled to the lower coupler 18 via an intermediary coupler assembly 82, as described further herein. In the decoupled condition, the upper coupler 22 is decoupled from the lower coupler 18, such that rotation of the lower coupler 18 does not rotate the upper coupler 22. In some implementations, wherein the jar assembly 24 is in the engaged condition with the heater assembly 26, the heater assembly 26 is in the attached condition with the housing assembly 12, and the jar assembly 24 is in the operably coupled condition with the housing assembly 12, the lower and upper couplers 18, 22 are coupled to each other within the interior space 34 defined by the collar 28 of the heater assembly 26.

In operation of an exemplary embodiment illustrated in FIGS. 1-3, initially, the jar assembly 24 is in the engaged condition with the heater assembly 26, the heater assembly 26 is in the attached condition with the housing assembly 12, and the jar assembly 24 is in the operably coupled condition with the housing assembly 12. In this configuration, operation of the motor 16 of the housing assembly 12 causes the lower coupler 18 to drive rotation of the upper coupler 22, which spins the blade 66 within the jar 42 of the jar assembly 24 to blend food disposed therein. Further, the heating element 40 is powered by the electricity source powering the motor 16 and is in forcible contact with the heat transfer element 62 of the jar assembly 24, such that thermal energy is efficiently transferred from the heating element 40 to the heat transfer element 62 and, ultimately, to the food within the jar 42. Next, a user moves the jar assembly 24 to the disengaged condition with respect to the heater assembly 26, the heater assembly 26 to the detached condition with respect to the housing assembly 12, and the jar assembly 24 to the decoupled position with respect to the housing assembly 12. In this configuration, the jar assembly 24 can be washed with water separately from the electronic components present in the heater assembly 26 and the housing assembly 12.

Figure 4:
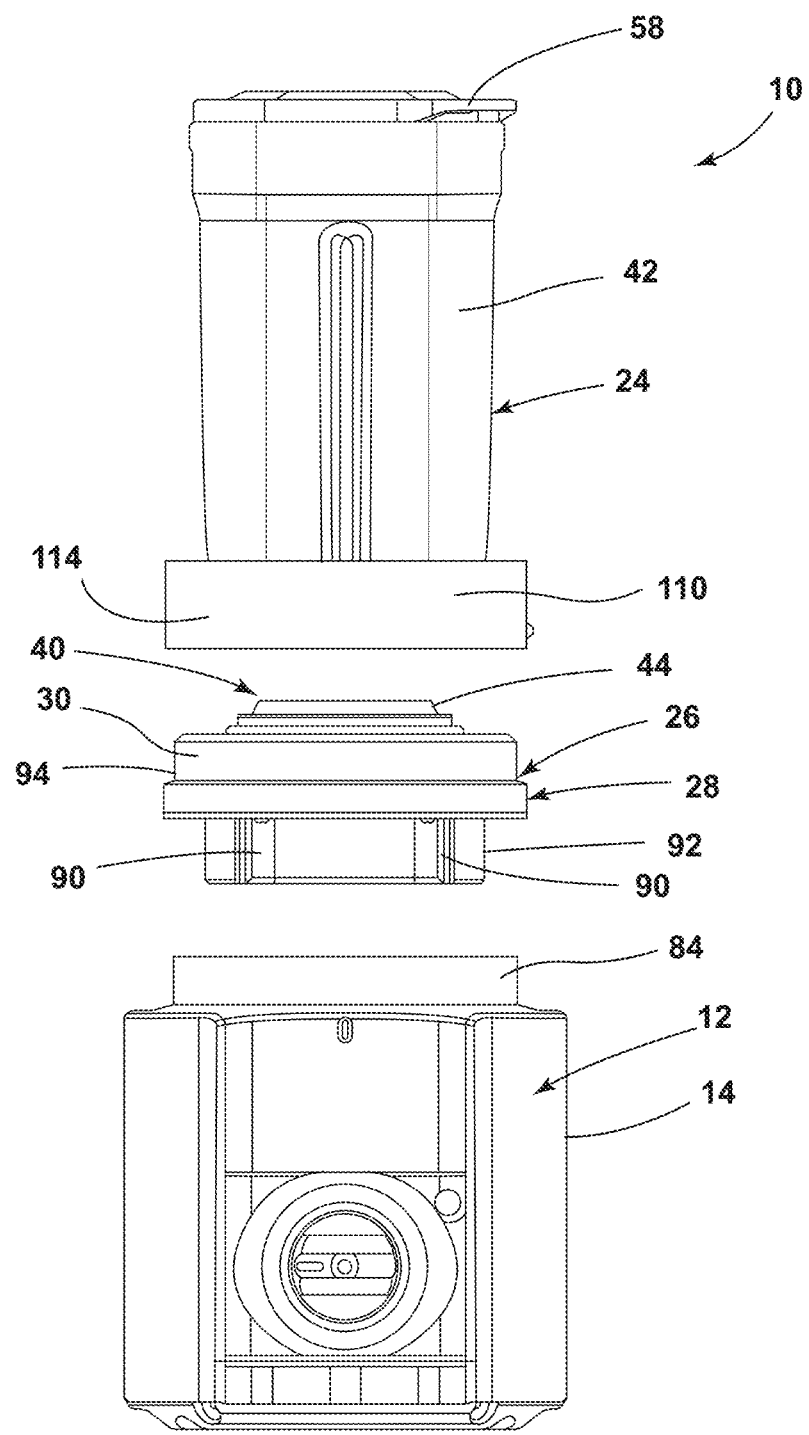
FIG. 4 is an exploded front elevational view of a blender assembly illustrating a jar assembly, a heater assembly, and a housing assembly.
Figure 5:
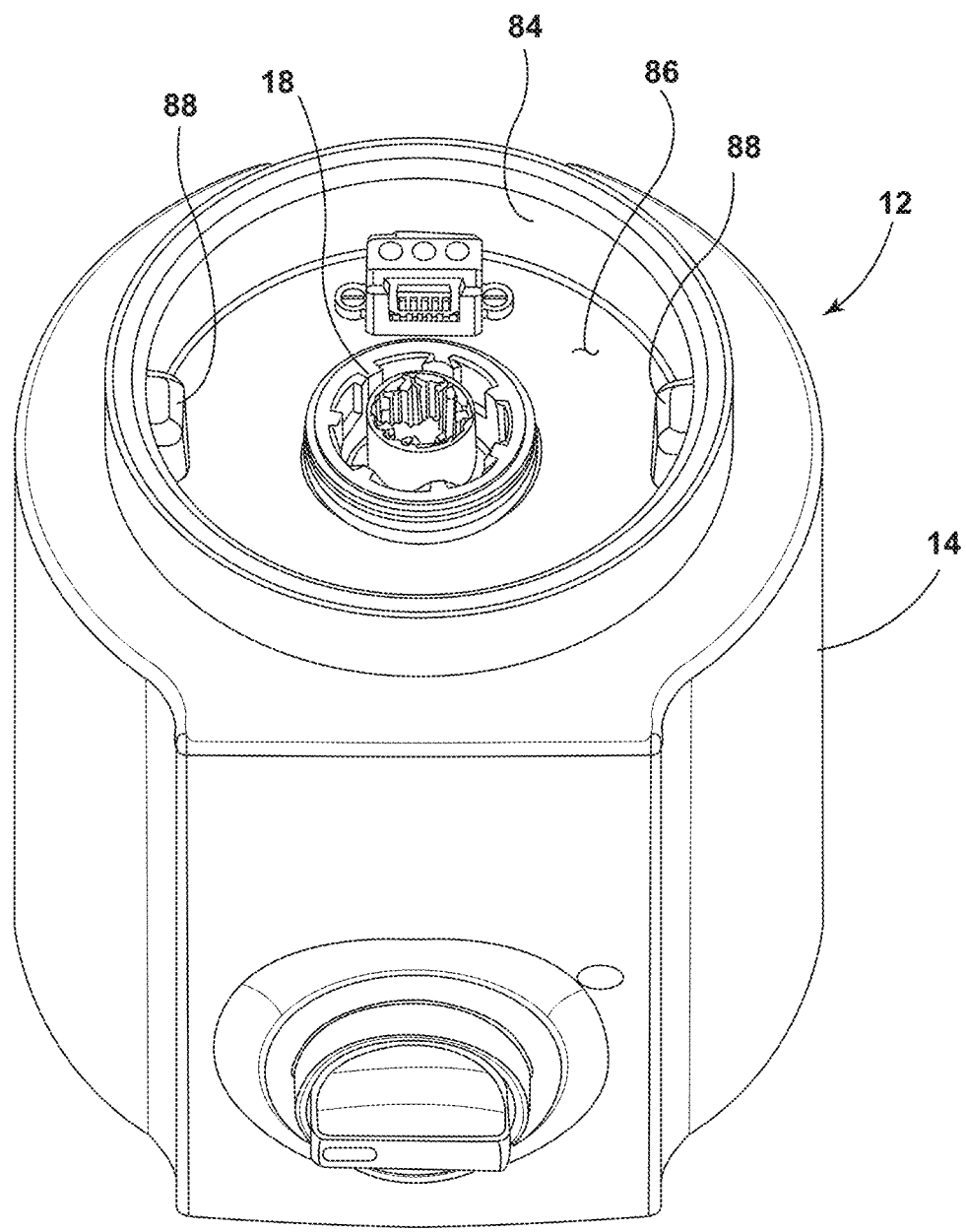
FIG. 5 is a top perspective view of the housing assembly of FIG. 4.

Referring now to FIGS. 4-14, an exemplary embodiment of the blender assembly 10 is disclosed. The blender assembly 10 includes the housing assembly 12, the heater assembly 26, and the jar assembly 24, as illustrated in FIG. 4. As illustrated in FIG. 5, the housing assembly 12 includes a heater assembly-receiving dish 84. The dish 84 defines a dish recess 86 in which the heater assembly 26 is configured to nest in the attached condition of the heater assembly 26, shown in FIGS. 11-14. As illustrated in FIG. 5, the dish 84 includes at least one guide protrusion 88 that extends into the dish recess 86 defined by the dish 84. The at least one guide protrusion 88 is configured to be received within a guide recess 90 of a lower annular component 92 of the collar 28 of the heater assembly 26 in the attached condition of the heater assembly 26, as described further herein.

Figure 6:
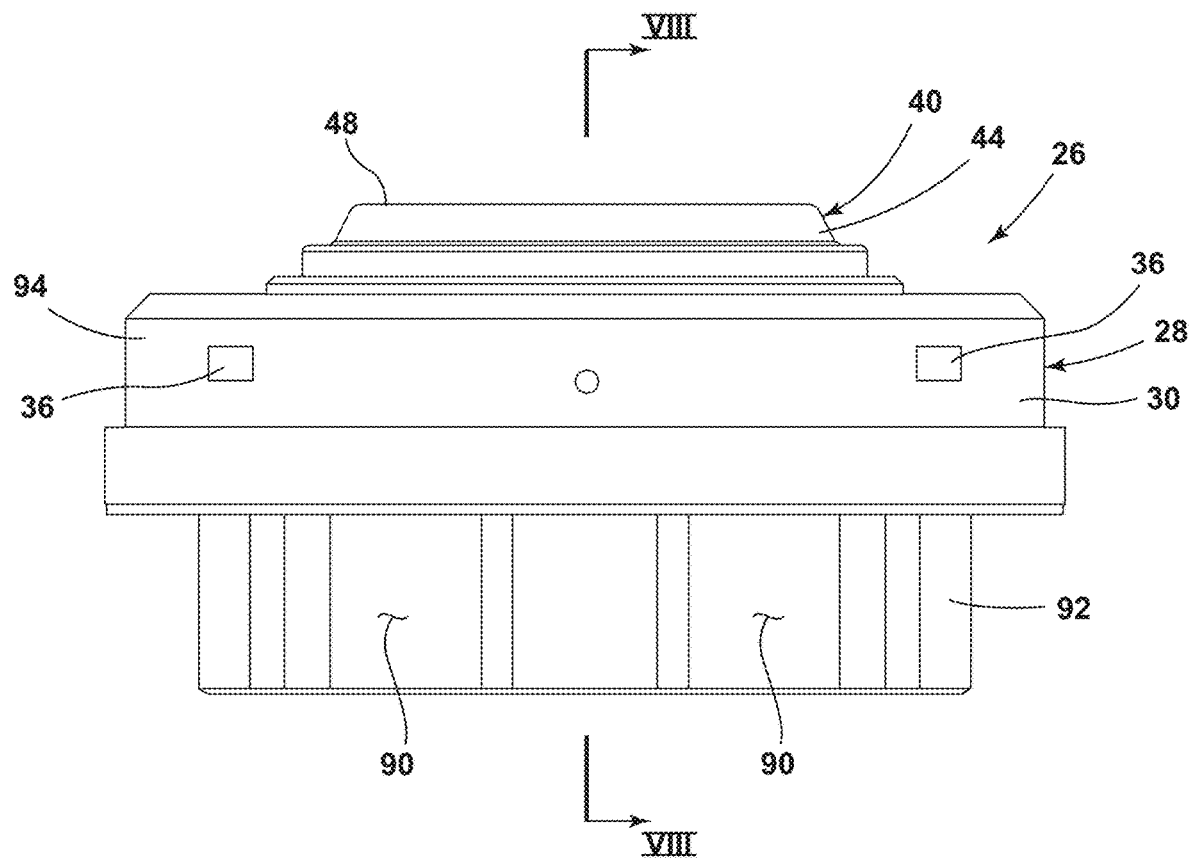
FIG. 6 is a side elevational view of the heater assembly of FIG. 4.
Figure 7:
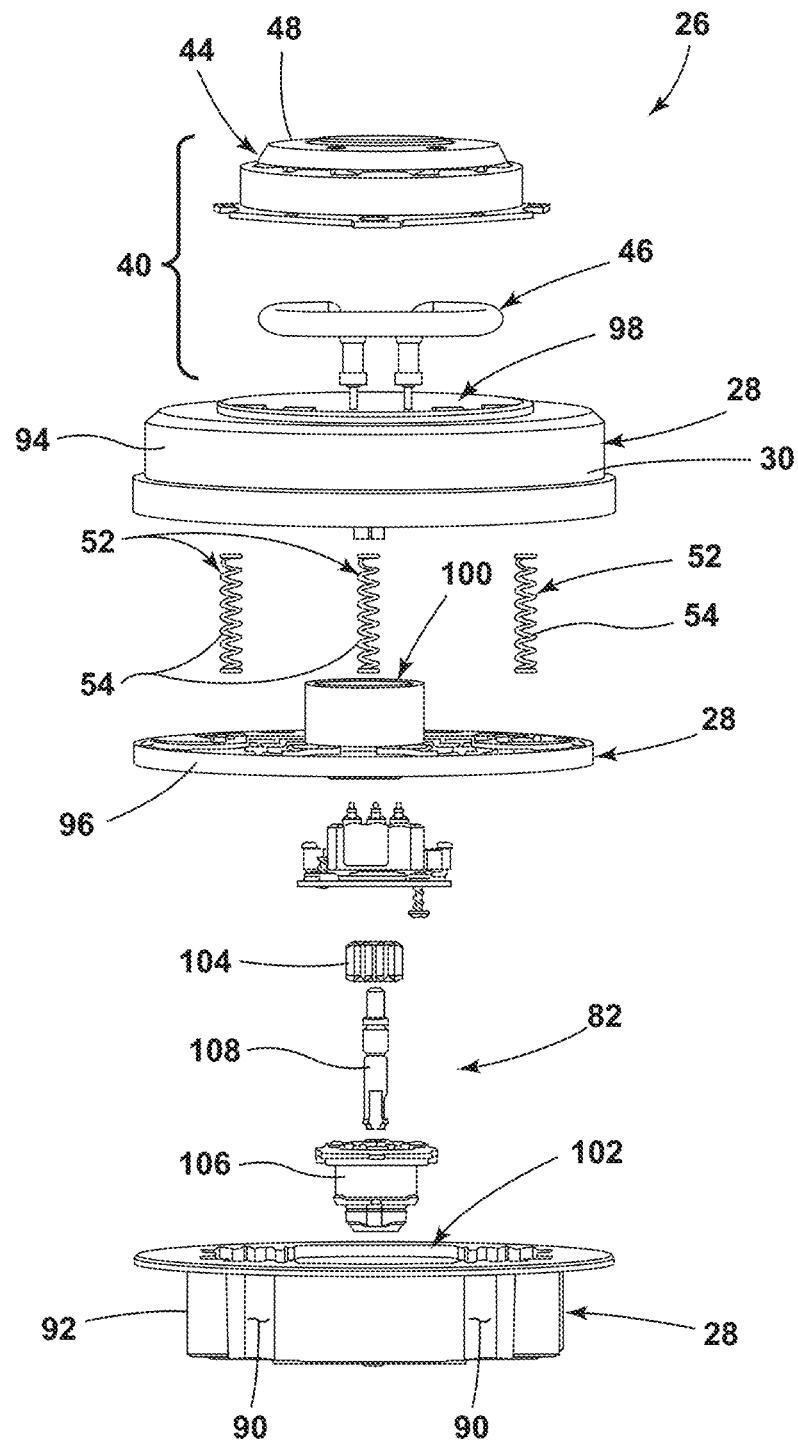
FIG. 7 is an exploded front elevational view of the heater assembly of FIG. 6.
Figure 8:
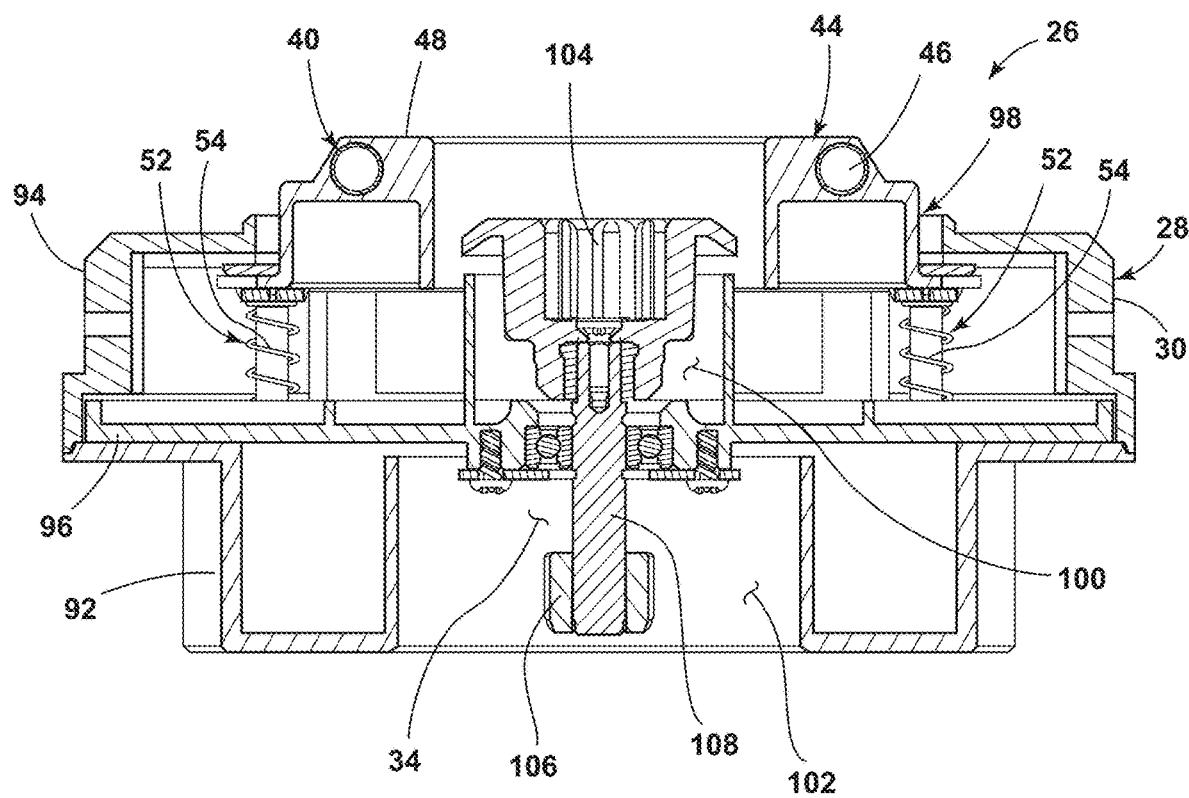
FIG. 8 is a front elevational cross-sectional view of the heater assembly of FIG. 6, taken through line VIII-VIII.

Referring now to FIGS. 6-8, the heater assembly 26 of the embodiment of the blender assembly 10 is illustrated. The heater assembly 26 includes the collar 28. The collar 28 includes the lower annular component 92, an upper annular component 94 coupled to the lower annular component 92, and an intermediary annular component 96 that is positioned between the upper and lower annular components 94, 92. The upper annular component 94 defines an upper aperture 98. The intermediary annular component 96 defines an intermediary aperture 100. The lower annular component 92 defines a lower aperture 102. The upper, lower, and intermediary apertures 98, 102, 100 cooperate to define the interior space 34 of the collar 28. In the embodiment illustrated in FIG. 9, the upper, lower, and intermediary apertures 98, 102, 100 are substantially concentric. As described above and illustrated in FIG. 6, the lower annular component 92 defines at least one guide recess 90 that receives the at least one guide protrusion 88 in the attached condition of the heater assembly 26.

Figure 14:
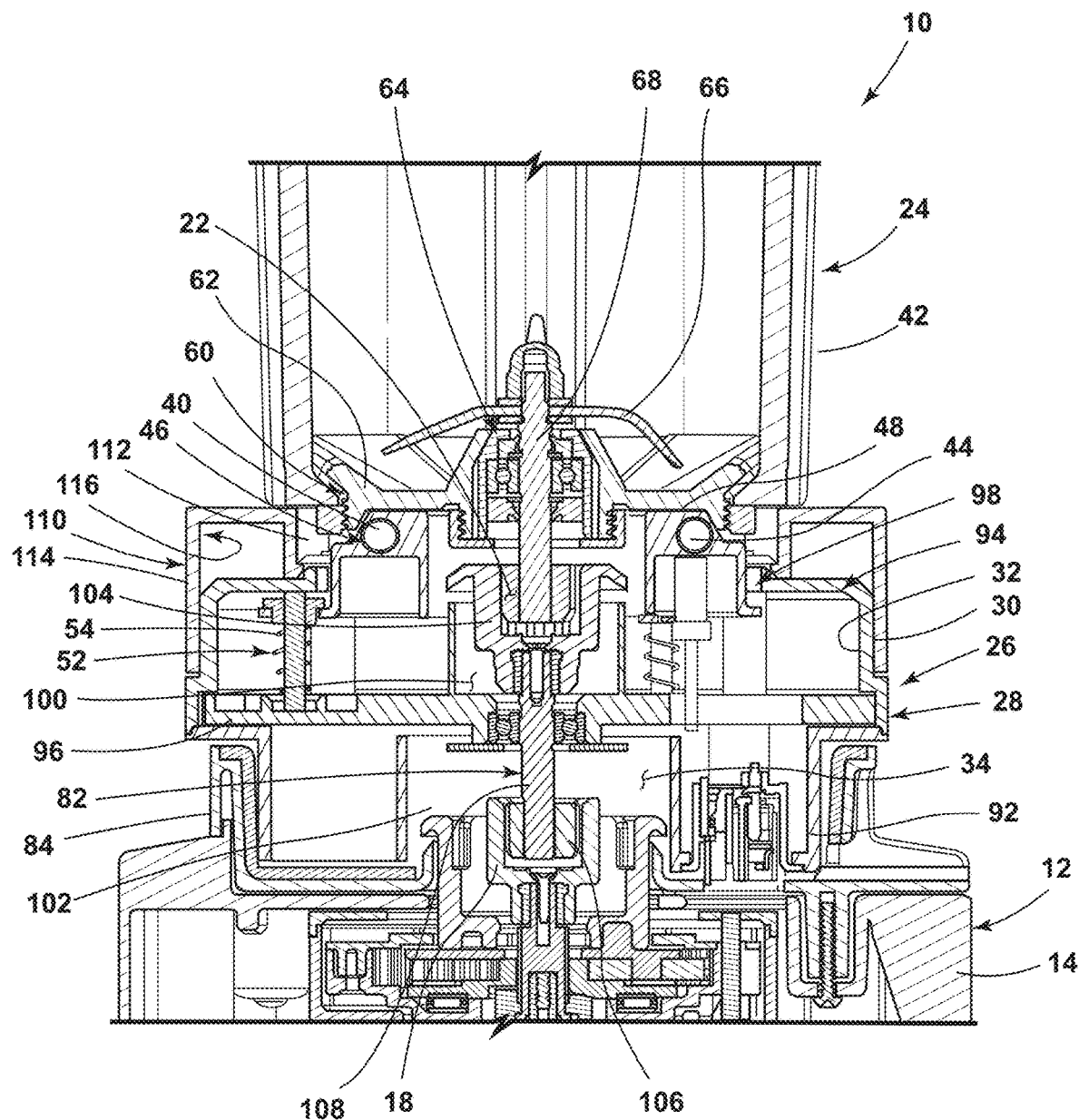
FIG. 14 is an enlarged partial cross-sectional view of the blender assembly of FIG. 12, taken through line XIV-XIV.

Referring now to FIGS. 6-8 and 14, the illustrated embodiment of the heater assembly 26 includes the intermediary coupler assembly 82. The intermediary coupler assembly 82 is positioned within the interior space 34, as illustrated in FIG. 8, and includes a first coupler 104, a second coupler 106 positioned downward of the first coupler 104, and an intermediary shaft 108 that is coupled to and extending between the first and second couplers 104, 106. In some implementations, wherein the jar assembly 24 is in the engaged condition with the heater assembly 26, the heater assembly 26 is in the attached condition with the housing assembly 12, and the jar assembly 24 is in the operably coupled condition with the housing assembly 12, the first coupler 104 is coupled directly to the upper coupler 22, and the second coupler 106 is coupled directly to the lower coupler 18, as illustrated in FIG. 14. As such, the upper coupler 22 is operably coupled to the lower coupler 18 via the intermediary coupler assembly 82.

Referring still to FIGS. 6-8, the illustrated embodiment of the heater assembly 26 includes the biasing feature 52. As illustrated in FIGS. 7 and 8, the biasing feature 52 includes the compression spring 54. Further, the heater assembly 26 includes the heating element 40. The heating element 40 includes the annular puck 44 and the heater coil 46 coupled to the annular puck 44. As illustrated in FIG. 8, the compression springs 54 are operably coupled to the annular puck 44 of the heating element 40 and are configured to exert an upward force on the annular puck 44. As further illustrated in FIG. 8, the annular puck 44 of the heating element 40 is positioned within the upper aperture 98 defined by the upper annular component 94 of the collar 28 and is operable to move downward against the biasing force exerted by the biasing feature 52, as described further herein.

Referring still to FIGS. 6-8, the heater assembly 26 includes the first attachment feature 36. In some implementations, the first attachment feature 36 is disposed on the exterior wall 30 of the collar 28. For example, as illustrated in FIG. 6, the first attachment feature 36 protrudes outward from an exterior surface of the exterior wall 30 of the upper annular component 94 of the collar 28. In the illustrated embodiment, the upper annular component 94 includes a plurality of first attachment features 36 that are configured to engage with a corresponding plurality of second attachment features 38 of the jar assembly 24 in a twist-lock manner, as described further herein. It is contemplated that the heater assembly 26 can include one or more of a plurality of types of first attachment features 36, in various implementations.

Figure 9:
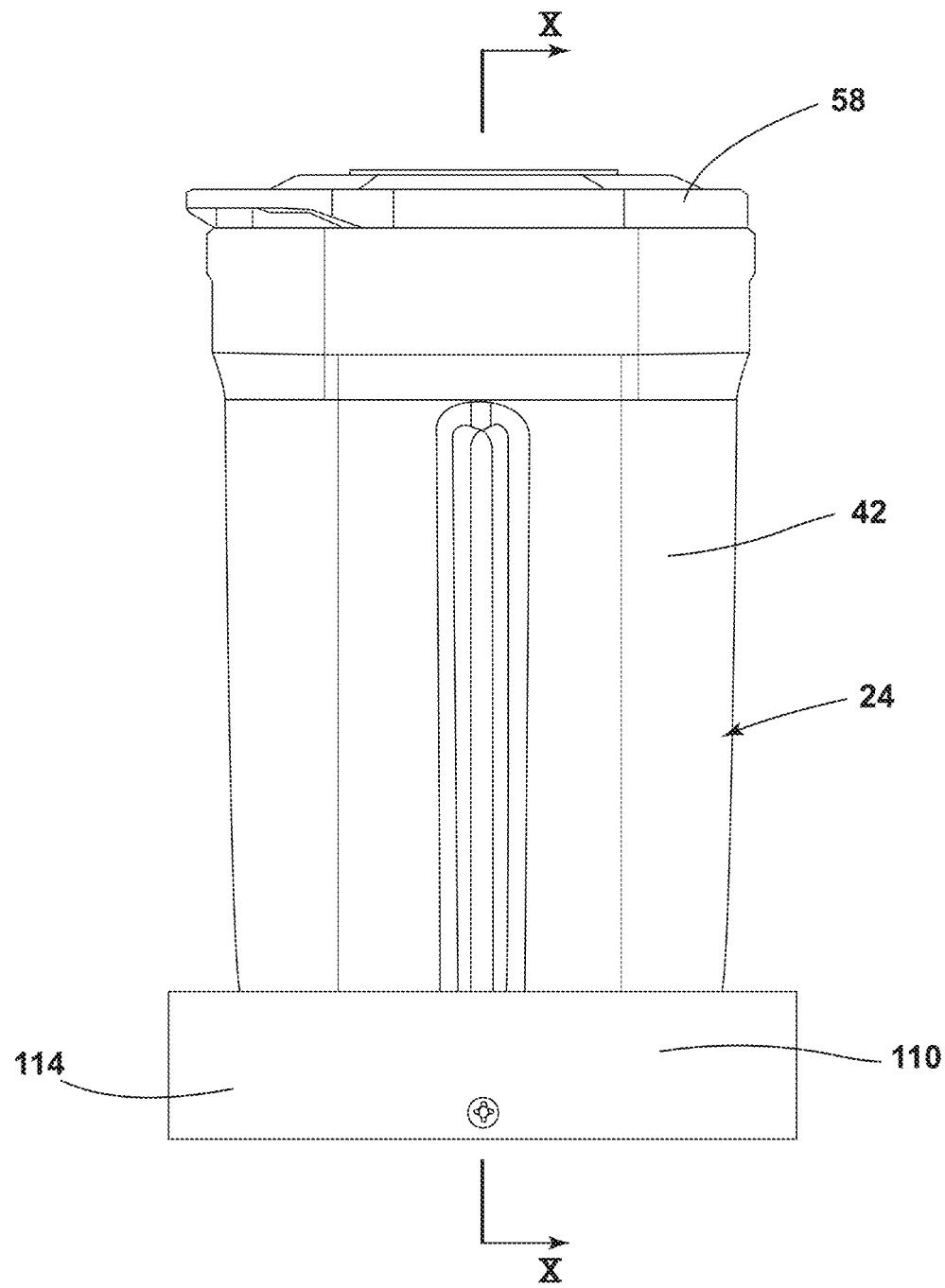
FIG. 9 is a side elevational view of the jar assembly of FIG. 4.
Figure 10:
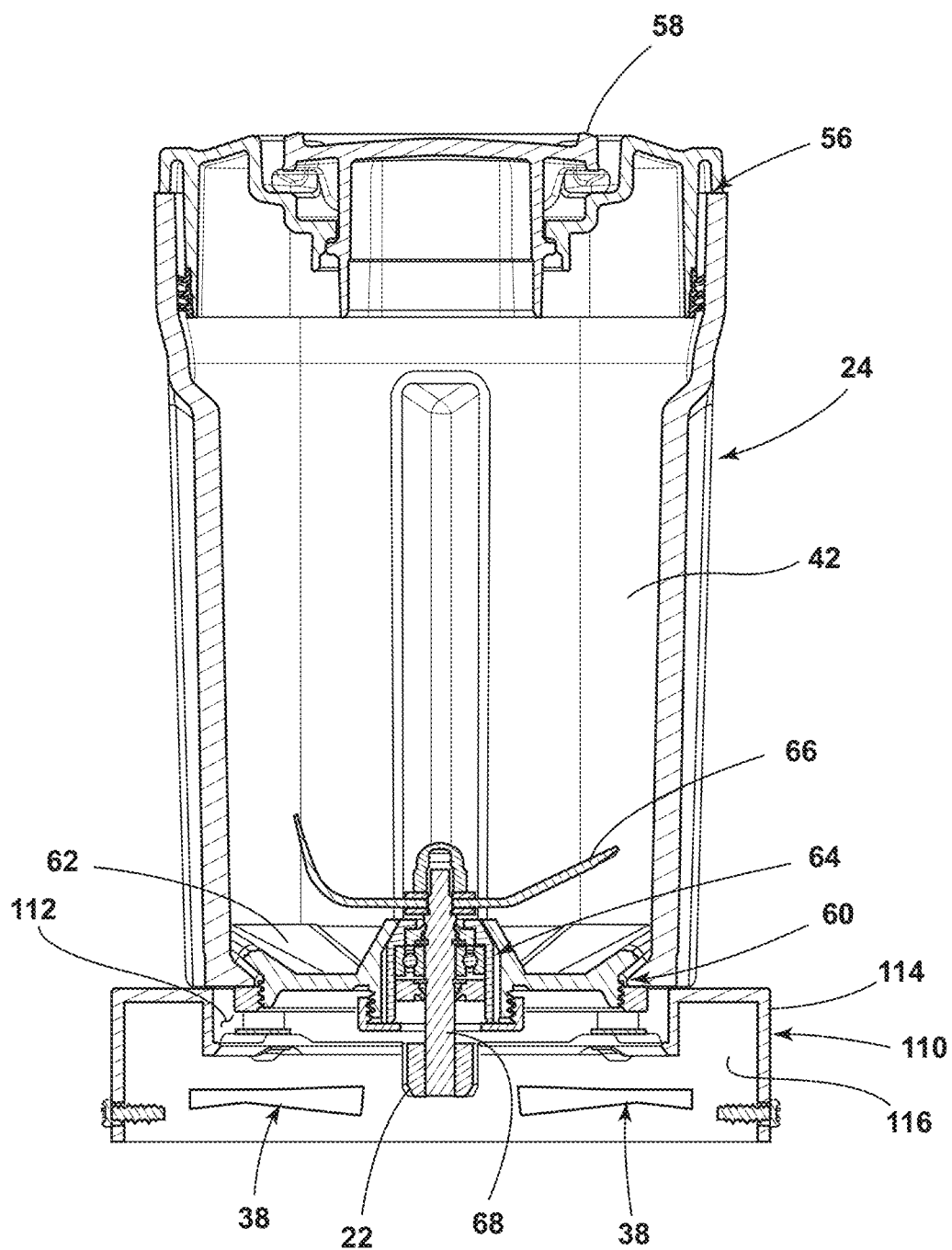
FIG. 10 is a front elevational cross-sectional view of the jar assembly of FIG. 9, taken through line X-X.
Figure 11:
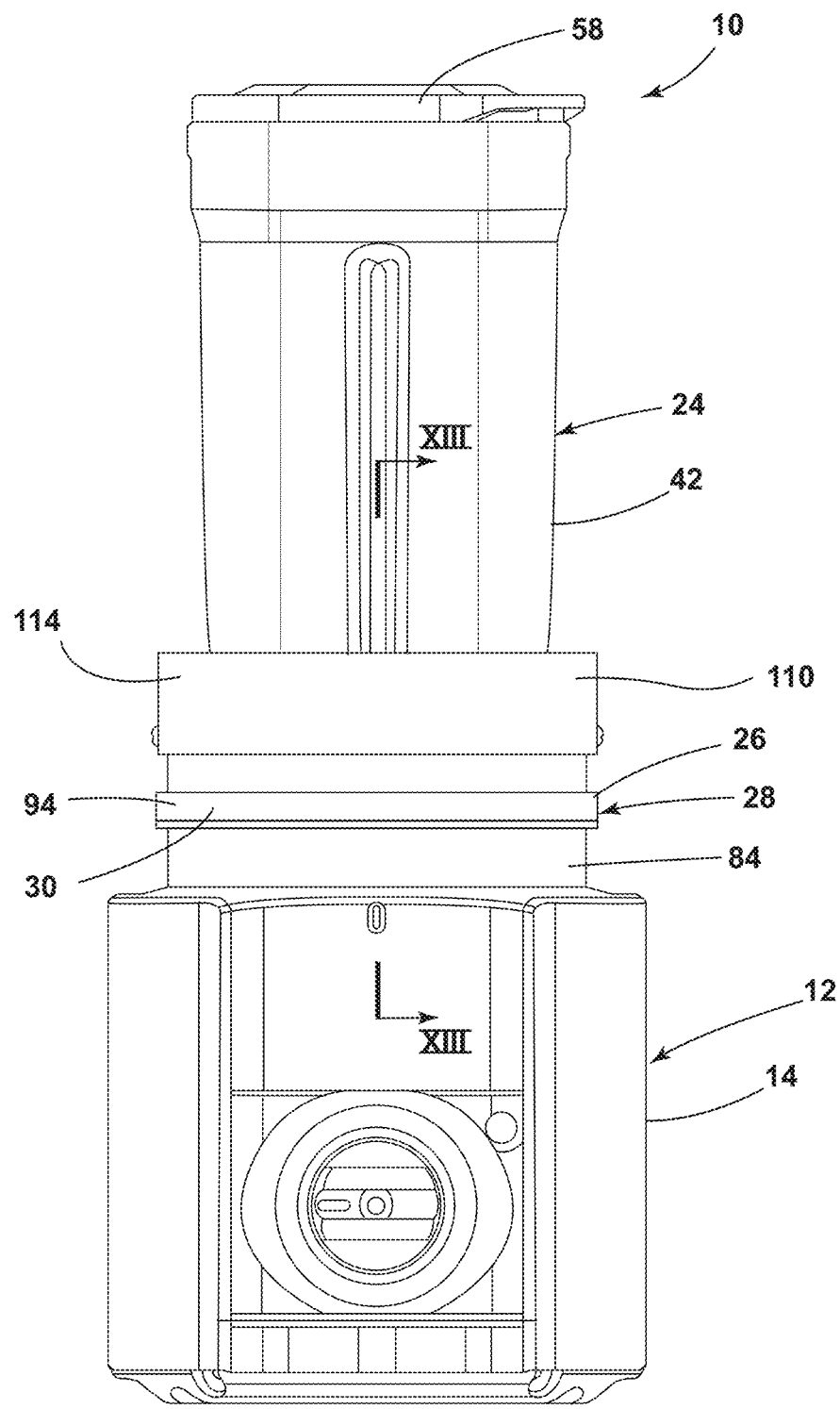
FIG. 11 is a front elevational view of a blender assembly illustrating a jar assembly in a disengaged condition with a heater assembly.

Referring now to FIGS. 9 and 10, the illustrated embodiment of the heater assembly 26 includes the jar assembly 24. The jar assembly 24 includes the jar 42, the heat transfer element 62 coupled to the jar 42, the blade 66 positioned upward of the heat transfer element 62, and the upper coupler 22 coupled to the blade 66 by the shaft 68, which extends through the heat transfer element aperture 64. As illustrated in FIGS. 9 and 10, the jar assembly 24 further includes an annular skirt 110 that defines a skirt aperture 112. The annular skirt 110 is coupled to and/or positioned downward of at least one of the jar 42 and the heat transfer element 62. The annular skirt 110 includes an outer surface 114 and an inner surface 116 that is opposite the outer surface 114. In some implementations, the inner surface 116 of the annular skirt 110 can include the second attachment feature 38. For example, as illustrated in FIG. 10, the annular skirt 110 includes a plurality of second attachment features 38 that are configured to be engaged with the first attachment features 36 disposed on the exterior wall 30 of the collar 28 illustrated in FIG. 8. It is contemplated that the annular skirt 110 can include one or more of a plurality of types of second attachment features 38 configured to engage with the first attachment feature 36 of the heater assembly 26. Further, coupling the jar assembly 24 and the heater assembly 26 via the first and second attachment features 36, 38 can result in a downward force being exerted on the heating element 40 against the upward force exerted by the biasing feature 52.

Figure 12:
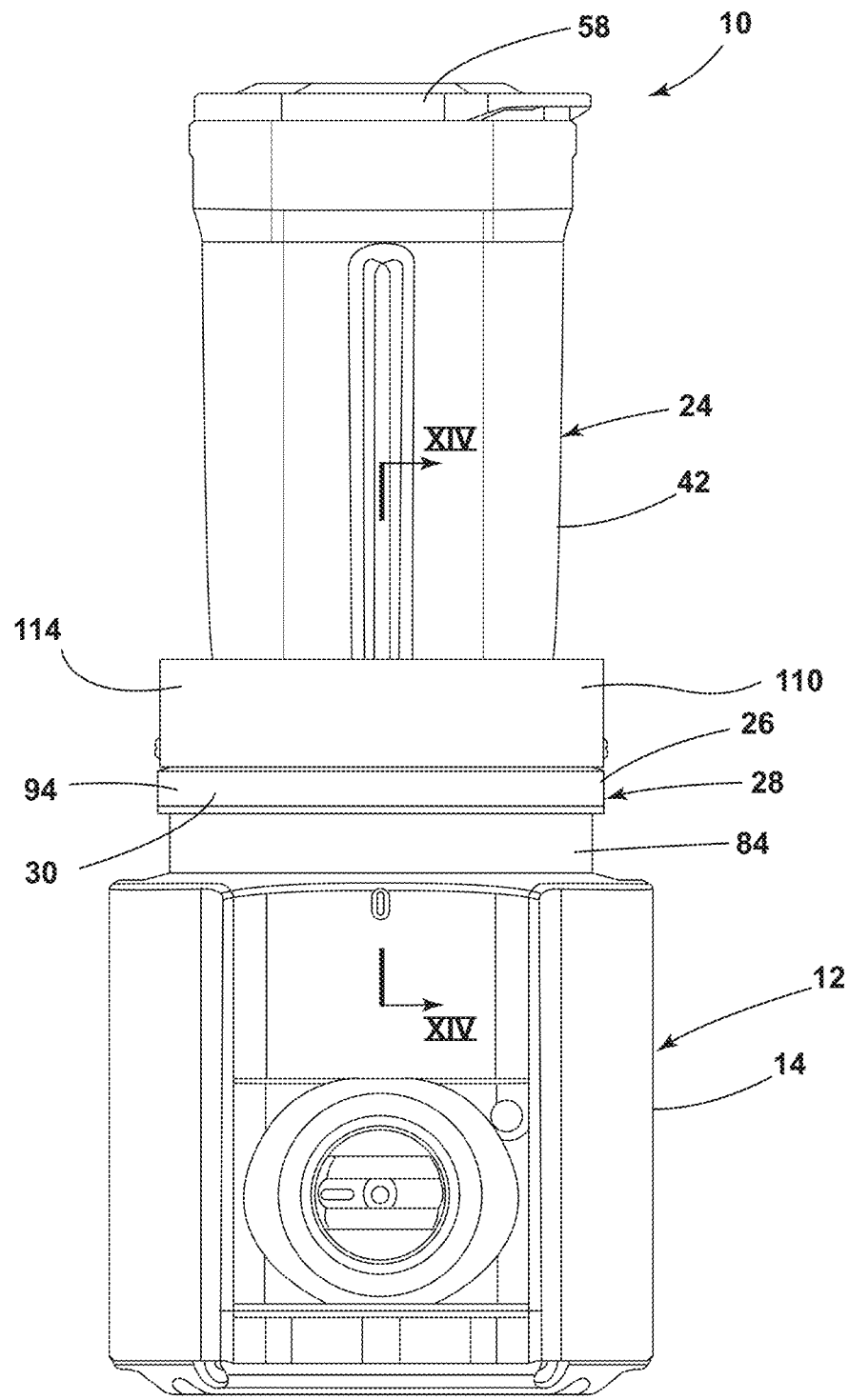
FIG. 12 is a front elevational view of the blender assembly of FIG. 11 illustrating the jar assembly in an engaged condition with the heater assembly.
Figure 13:
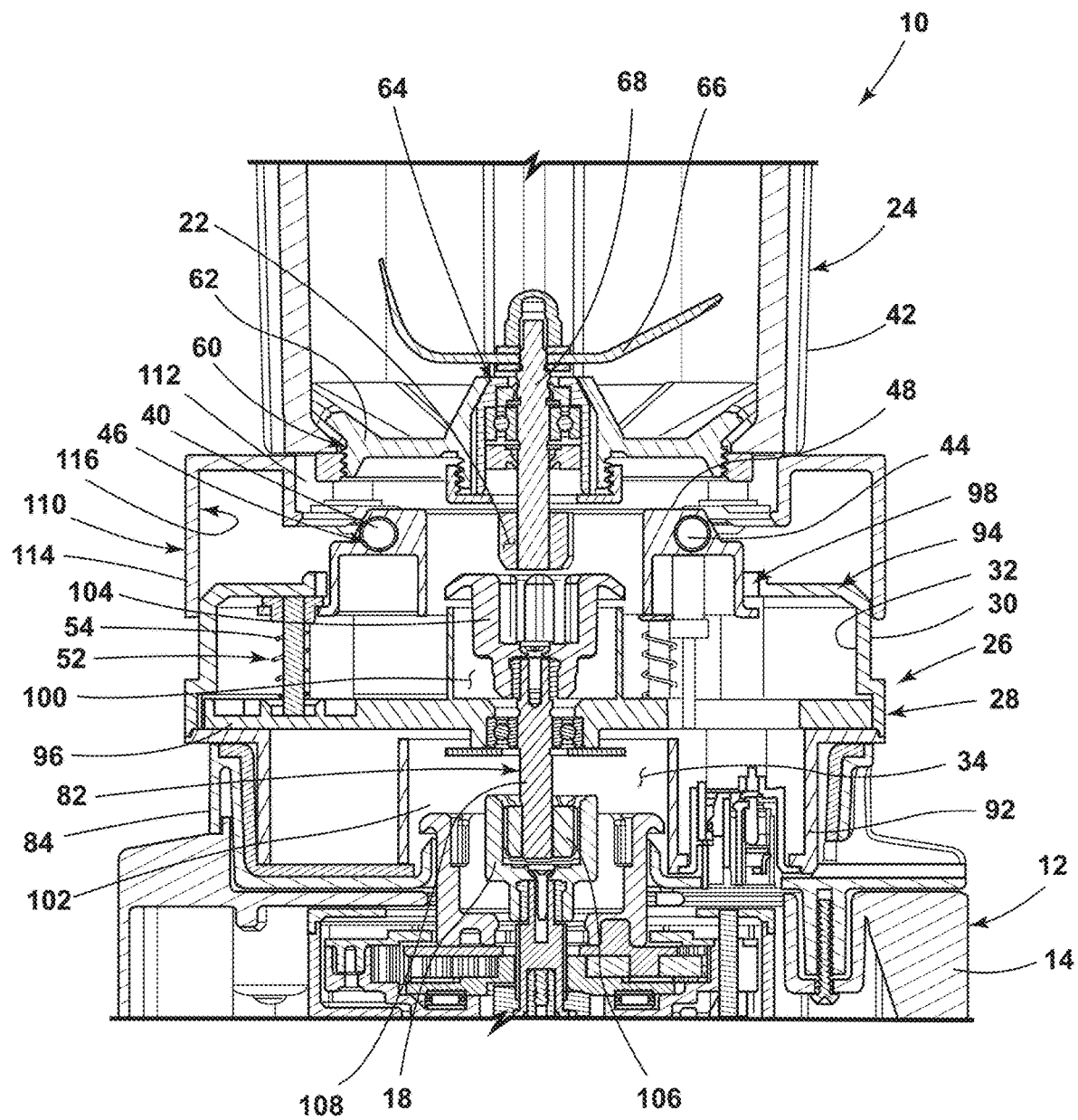
FIG. 13 is an enlarged partial cross-sectional view of the blender assembly of FIG. 11, taken through line XIII-XIII.

Referring now to FIGS. 11-14, the jar assembly 24 of the illustrated embodiment of the blender assembly 10 is operable to move between the engaged condition and the disengaged condition relative to the heater assembly 26. In the embodiment illustrated in FIGS. 11 and 13, the jar assembly 24 is in the disengaged condition with the heater assembly 26, such that the upper surface 48 of the heating element 40 is a first distance from the base 14 of the housing assembly 12. As illustrated in FIGS. 12 and 14, the jar assembly 24 is in the engaged condition with the heater assembly 26, such that the upper surface 48 of the heating element 40 is a second distance from the base 14. The second distance is less than the first distance.

According to one aspect of the present disclosure, a blender assembly includes a housing assembly having a base with a motor disposed therein and a lower coupler operably coupled to the motor, a heater assembly selectively coupled with the housing assembly via the base, and a jar assembly. The heater assembly is operable to move between an attached condition and a detached condition. In the attached condition of the heater assembly, the heater assembly is attached to the base. In the detached condition of the heater assembly, the heater assembly is detached from the base. The heater assembly includes a collar having an interior wall that includes a first attachment feature and defines an interior space, a biasing feature coupled to the collar, and a heating element operably coupled to the biasing feature, such that the biasing feature exerts a biasing force against the heating element away from the base in the attached condition of the heater assembly. The jar assembly includes a jar that defines an upper opening, a heat transfer element coupled to the jar, a blade positioned within the jar upward of the heat transfer element, an upper coupler coupled to the blade via a shaft that extends through a heat transfer element aperture defined by the heat transfer element, and a second attachment feature positioned lower than the blade. The jar assembly is selectively coupled with the housing assembly and operable to move between an operably coupled condition and a decoupled condition. In the operably coupled condition of the jar assembly, the upper coupler is operably coupled with the lower coupler, such that rotation of the lower coupler by the motor prompts rotation of the upper coupler. The jar assembly is selectively coupled to the heater assembly and operable between an engaged condition and a disengaged condition. In the engaged condition of the jar assembly, the second attachment feature is engaged with the first attachment feature to maintain the jar assembly and the heater assembly in a coupled-relationship. In the disengaged condition of the jar assembly, the second attachment feature is disengaged from the first attachment feature. Further, movement of the jar assembly from the disengaged condition to the engaged condition causes the heat transfer element of the jar assembly to contact the heating element of the heater assembly and move the heating element toward the base against the biasing force exerted by the biasing feature.

According to another aspect of the present disclosure, a blender assembly includes a housing assembly having a base with a motor disposed therein and a lower coupler operably coupled to the motor, a heater assembly selectively coupled with the housing assembly via the base and operable to move between an attached condition and a detached condition, and a jar assembly. In the attached condition of the heater assembly, the heater assembly is attached to the base. In the detached condition of the heater assembly, the heater assembly is detached from the base. The heater assembly includes a collar that includes a lower annular component that defines a lower aperture and is configured to be coupled to the base of the housing assembly in the attached condition, an upper annular component that defines an upper aperture and is coupled to the lower annular component, and an intermediary annular component that defines an intermediary aperture and is positioned between the upper and lower annular components. The upper, lower, and intermediary apertures cooperate to define an interior space. The heater assembly also includes a first attachment feature coupled to the collar, an intermediary coupler assembly that is positioned within the interior space and includes a first coupler, a second coupler positioned downward of the first coupler, and an intermediary shaft that extends between the first and second couplers, a biasing feature coupled to the collar, and a heating element operably coupled to the biasing feature, such that the biasing feature exerts a biasing force against the heating element away from the base in the attached condition of the heater assembly. The heating element includes an annular puck that is positioned within the upper aperture defined by the upper annular component of the collar, and a heater coil coupled to the annular puck. The jar assembly includes a jar that includes upper and lower openings, a heat transfer element coupled to the jar, such that the heat transfer element covers the lower opening, the heat transfer element defining a heat transfer element aperture, a blade positioned within the jar upward of the heat transfer element, an upper coupler coupled to the blade via a shaft that extends through the heat transfer element aperture defined by the heat transfer element, and a second attachment feature positioned lower than the blade. The jar assembly is selectively coupled with the housing assembly and operable to move between an operably coupled condition and a decoupled condition. In the operably coupled condition of the jar assembly, the upper coupler is operably coupled with the lower coupler via the intermediary coupler assembly, such that rotation of the lower coupler by the motor prompts rotation of the upper coupler. The jar assembly is selectively coupled to the heater assembly and operable between an engaged condition and a disengaged condition. In the engaged condition of the jar assembly, the second attachment feature is engaged with the first attachment feature to maintain the jar assembly and the heater assembly in a coupled-relationship. In the disengaged condition of the jar assembly, the second attachment feature is disengaged from the first attachment feature. Further, movement of the jar assembly from the disengaged condition to the engaged condition causes the heat transfer element of the jar assembly to contact the heating element of the heater assembly and move the heating element toward the base against the biasing force exerted by the biasing feature.

According to yet another aspect of the present disclosure, a blender assembly includes a base, a heater assembly selectively coupled to the base and having a heating element and a biasing feature that biases the heating element away from the base, and a jar assembly selectively coupled to the heater assembly and having a jar and a heat transfer element coupled to the jar. Coupling the jar assembly to the heater assembly prompts the heat transfer element to contact the heating element, such that the heating element moves toward the base against the bias of the biasing feature.

According to yet another aspect of the present disclosure, a blender assembly includes a base, a heater assembly selectively coupled to the base and having a heating element, and a jar assembly selectively coupled to the heater assembly and having a jar and a heat transfer element coupled to the jar. The heat transfer element contacts the heating element when the jar assembly is coupled to the heater assembly.

According to another aspect, the heater assembly is operable to move between an attached condition and a detached condition. In the attached condition, the heater assembly is attached to the base. In the detached condition, the heater assembly is detached from the base. The heater assembly further includes a biasing feature that exerts a biasing force on the heating element away from the base in the attached condition of the heater assembly.

According to another aspect, the heater assembly further includes a collar that defines an interior space. The biasing feature is coupled to the collar.

According to another aspect, the collar includes a first attachment feature.

According to another aspect, the jar assembly further includes a blade positioned within the jar upward of the heat transfer element, and a second attachment feature positioned lower than the blade.

According to another aspect, the jar assembly is selectively coupled to the heater assembly, such that the heater assembly is operable between an engaged condition and a disengaged condition. In the engaged condition, the second attachment feature is engaged with the first attachment feature to maintain the jar assembly and the heater assembly in a coupled-relationship. In the disengaged condition, the second attachment feature is disengaged from the first attachment feature.

According to another aspect, movement of the jar assembly from the disengaged condition to the engaged condition causes the heat transfer element of the jar assembly to contact the heating element of the heater assembly and move the heating element toward the base against the biasing force exerted by the biasing feature.

According to another aspect, the blender assembly further includes a motor disposed within the base, and a lower coupler operably coupled to the motor.

According to another aspect, the collar of the heater assembly includes a lower annular component that defines a lower aperture, an upper annular component that defines an upper aperture and is coupled to the lower annular component, and an intermediary annular component that defines an intermediary aperture and is positioned between the upper and lower annular components. The upper, lower, and intermediary apertures cooperate to define the interior space.

According to another aspect, the lower annular component contacts the base in the attached condition of the heater assembly.

According to another aspect, the jar assembly further includes a blade positioned within the jar upward of the heat transfer element, and an upper coupler coupled to the blade via a shaft that extends through a heat transfer element aperture defined by the heat transfer element.

According to another aspect, the jar assembly is selectively coupled with a housing assembly of the blender assembly that includes the base, the motor, and the lower coupler, such that the jar assembly is operable to move between an operably coupled condition and a decoupled condition. In the coupled condition, the upper coupler is operably coupled with the lower coupler, such that rotation of the lower coupler by the motor prompts rotation of the upper coupler.

According to another aspect, the blender assembly further includes an intermediary coupler assembly that is positioned within the interior space of the collar and includes a first coupler, a second coupler positioned downward of the first coupler, and an intermediary shaft that extends between the first and second couplers. The upper coupler is operably coupled with the lower coupler via the intermediary coupler assembly in the operably coupled condition of the jar assembly.

According to another aspect, the heating element includes an annular puck that is positioned within the interior space defined by the collar, and a heater coil coupled to the annular puck.

According to another aspect, the jar defines an upper opening and a lower opening, and the heat transfer element is configured to generally fill the lower opening, such that the heat transfer element functions as a bottom of the jar.

According to another aspect of the present disclosure, a heater assembly for a blender assembly includes a collar that defines an interior space, a heating element disposed at least partially within the interior space, and a biasing feature operably coupled with the collar and the heating element and being configured to bias the heating element in a first direction. The heating element is operable to move relative to the collar in a second direction that is opposite the first direction against the bias of the biasing feature.

According to another aspect, the collar includes a lower annular component that defines a lower aperture, an upper annular component that defines an upper aperture and is coupled to the lower annular component, and an intermediary annular component that defines an intermediary aperture and is positioned between the upper and lower annular components. The upper, lower, and intermediary apertures cooperate to define the interior space.

According to another aspect, the heating element is disposed at least partially within the upper aperture defined by the upper annular component of the collar.

According to another aspect, the heating element includes an annular puck that is positioned at least partially within the interior space defined by the collar, and a heater coil coupled to the annular puck.

According to another aspect, an upper surface of the heating element is elevated relative to the collar.

According to yet another aspect of the present disclosure, a blender assembly includes a base, a heater assembly selectively coupled to the base and having a heating element and a biasing feature that biases the heating element away from the base, and a jar assembly selectively coupled to the heater assembly and having a jar and a heat transfer element coupled to the jar. Coupling the jar assembly to the heater assembly prompts the heat transfer element to contact the heating element, such that the heating element moves toward the base against the bias of the biasing feature.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A blender assembly, comprising:
   a base;
   a heater assembly selectively coupled to the base and having a heating element, wherein the heater assembly is operable to move between an attached condition, where the heater assembly is attached to the base, and a detached condition, where the heater assembly is detached from the base, and wherein the heater assembly further includes a biasing feature that exerts a biasing force on the heating element away from the base in the attached condition of the heater assembly; and a jar assembly selectively coupled to the heater assembly and having a jar and a heat transfer element coupled to the jar, wherein the heat transfer element contacts the heating element when the jar assembly is coupled to the heater assembly.

2. The blender assembly of claim 1, wherein the heater assembly further comprises:
a collar that defines an interior space, wherein the biasing feature is coupled to the collar.

3. The blender assembly of claim 2, wherein the collar includes a first attachment feature.

4. The blender assembly of claim 3, wherein the jar assembly further comprises:
a blade positioned within the jar upward of the heat transfer element; and
a second attachment feature positioned lower than the blade.

5. The blender assembly of claim 4, wherein the jar assembly is selectively coupled to the heater assembly, such that the heater assembly is operable between an engaged condition, wherein the second attachment feature is engaged with the first attachment feature to maintain the jar assembly and the heater assembly is a coupled-relationship, and a disengaged condition, wherein the second attachment feature in disengaged from the first attachment feature.

6. The blender assembly of claim 5, wherein movement of the jar assembly from the disengaged condition to the engaged condition causes the heat transfer element of the jar assembly to contact the heating element of the heater assembly and move the heating element toward the base against the biasing force exerted by the biasing feature.

7. The blender assembly of claim 2, further comprising:
a motor disposed within the base; and
a lower coupler operably coupled to the motor.

8. The blender assembly of claim 7, wherein the collar of the heater assembly comprises:
a lower annular component that defines a lower aperture;
an upper annular component that defines an upper aperture and is coupled to the lower annular component; and
an intermediary annular component that defines an intermediary aperture and is positioned between the upper and lower annular components, wherein the upper, lower, and intermediary apertures cooperate to define the interior space.

9. The blender assembly of claim 8, wherein the lower annular component contacts the base in the attached condition of the heater assembly.

10. The blender assembly of claim 8, wherein the jar assembly further comprises:
a blade positioned within the jar upward of the heat transfer element; and
an upper coupler coupled to the blade via a shaft that extends through a heat transfer element aperture defined by the heat transfer element.

11. The blender assembly of claim 10, wherein the jar assembly is selectively coupled with a housing assembly of the blender assembly that includes the base, the motor, and the lower coupler, such that the jar assembly is operable to move between an operably coupled condition, wherein the upper coupler is operably coupled with the lower coupler, such that rotation of the lower coupler by the motor prompts rotation of the upper coupler, and a decoupled condition.

12. The blender assembly of claim 11, further comprising:
an intermediary coupler assembly that is positioned within the interior space of the collar and includes a first coupler, a second coupler positioned downward of the first coupler, and an intermediary shaft that extends between the first and second couplers, wherein the upper coupler is operably coupled with the lower coupler via the intermediary coupler assembly in the operably coupled condition of the jar assembly.

13. The blender assembly of claim 2, wherein the heating element comprises:
an annular puck that is positioned within the interior space defined by the collar; and
a heater coil coupled to the annular puck.

14. A heater assembly for a blender assembly, comprising:
a collar that defines an interior space;
a heating element disposed at least partially within the interior space; and
a biasing feature operably coupled with the collar and the heating element and being configured to bias the heating element in a first direction, wherein the heating element is operable to move relative to the collar in a second direction that is opposite the first direction against the bias of the biasing feature.

15. The heater assembly of claim 14, wherein the collar comprises:
a lower annular component that defines a lower aperture;
an upper annular component that defines an upper aperture and is coupled to the lower annular component; and
an intermediary annular component that defines an intermediary aperture and is positioned between the upper and lower annular components, wherein the upper, lower, and intermediary apertures cooperate to define the interior space.

16. The heater assembly of claim 15, wherein the heating element is disposed at least partially within the upper aperture defined by the upper annular component of the collar.

17. The heater assembly of claim 14, wherein the heating element comprises:
an annular puck that is positioned at least partially within the interior space defined by the collar; and
a heater coil coupled to the annular puck.

18. The heater assembly of claim 14, wherein an upper surface of the heating element is elevated relative to the collar.

19. A blender assembly, comprising:
a base;
a heater assembly selectively coupled to the base and having a heating element and a biasing feature that biases the heating element away from the base; and
a jar assembly selectively coupled to the heater assembly and having a jar and a heat transfer element coupled to the jar, wherein coupling the jar assembly to the heater assembly prompts the heat transfer element to contact the heating element, such that the heating element moves toward the base against the bias of the biasing feature.

* * * * *